(12) United States Patent
Delrue et al.

(10) Patent No.: US 6,613,371 B2
(45) Date of Patent: Sep. 2, 2003

(54) METHOD FOR MALTING SEEDS

(75) Inventors: Rita M. Delrue, Minnetonka, MN (US); Theo Coppens, Tremelo (BE); Jan Delcour, Heverlee (BE); Iris Noots, Geel (BE); Chris Michiels, Kessel-Lo (BE)

(73) Assignee: Cargill, Incorporated, Minneapolis, MN (US)

( * ) Notice: Subject to any disclaimer, the term of this patent is extended or adjusted under 35 U.S.C. 154(b) by 228 days.

(21) Appl. No.: 09/736,961

(22) Filed: Dec. 14, 2000

(65) Prior Publication Data

US 2001/0043966 A1 Nov. 22, 2001

Related U.S. Application Data

(63) Continuation-in-part of application No. 09/461,890, filed on Dec. 15, 1999, which is a continuation-in-part of application No. 09/081,380, filed on May 19, 1998, now Pat. No. 6,086,935, said application No. 09/736,961, is a continuation-in-part of application No. 08/898,736, filed on Jul. 23, 1997.

(51) Int. Cl.⁷ ............................. A23B 9/00; C12C 11/00
(52) U.S. Cl. ........................... 426/511; 426/16; 426/629
(58) Field of Search ........................ 426/511, 16, 455, 426/629

(56) References Cited

U.S. PATENT DOCUMENTS

| | | |
|---|---|---|
| 198,192 A | 12/1877 | d Heureuse |
| 1,010,202 A | 11/1911 | Thomas |
| 1,574,210 A | 2/1926 | Spaulding |
| 1,750,508 A | 3/1930 | Cornelius |
| 2,704,257 A | 3/1955 | De Sollano et al. |
| 2,801,176 A | 7/1957 | Ozai-Durrani |
| 2,903,399 A | 9/1959 | Dixon |
| 3,035,918 A | 5/1962 | Sorgenti et al. |
| 3,159,493 A | 12/1964 | Japikse et al. |
| 3,159,494 A | 12/1964 | Lawrence et al. |
| 3,194,664 A | 7/1965 | Eytinge |
| 3,212,904 A | 10/1965 | Gould et al. |
| 3,368,902 A | 2/1968 | Berg |
| 3,404,986 A | 7/1968 | Wimmer et al. |
| 3,554,772 A | 1/1971 | Hankinson et al. |
| 3,653,915 A | 4/1972 | Rubio |
| 3,655,385 A | 4/1972 | Rubio |
| 3,859,452 A | 1/1975 | Mendoza |
| 4,140,802 A | 2/1979 | Kelly et al. |
| 4,255,459 A | 3/1981 | Glen |
| 4,315,380 A | 2/1982 | Davidson |
| 4,329,371 A | 5/1982 | Hart |
| RE31,513 E | 1/1984 | Glen |
| 4,543,263 A | 9/1985 | Goldhahn |
| 4,547,383 A | 10/1985 | Goldhahn |
| 4,555,409 A | 11/1985 | Hart |
| 4,594,260 A | 6/1986 | Vaqueiro et al. |
| 4,770,891 A | 9/1988 | Willard |
| 4,844,933 A | 7/1989 | Hsieh et al. |
| 4,844,937 A | 7/1989 | Wilkinson et al. |
| 4,882,188 A | 11/1989 | Sawada et al. |
| 4,903,414 A | 2/1990 | White et al. |
| 4,985,269 A | 1/1991 | Irvin et al. |
| 4,996,063 A | 2/1991 | Inglett |
| 5,176,931 A | 1/1993 | Herbster |
| 5,225,224 A | 7/1993 | VanNortwick |
| 5,296,253 A | 3/1994 | Lusas et al. |
| 5,312,630 A | 5/1994 | Pfaff |
| 5,532,013 A | 7/1996 | Martinez-Bustos et al. |
| 5,558,886 A | 9/1996 | Martinez-Bustos et al. |
| 5,558,898 A | 9/1996 | Sunderland |
| 5,589,214 A | 12/1996 | Palm |
| 5,637,342 A | 6/1997 | Brooks et al. |
| 5,652,010 A | 7/1997 | Glimmer et al. |
| 5,681,600 A | 10/1997 | Antinone et al. |
| 5,700,505 A | 12/1997 | Hurst |
| 5,738,892 A | 4/1998 | Takaoka |
| 5,811,143 A | 9/1998 | Ingemanson |
| 5,955,070 A | 9/1999 | Boivin et al. |
| 6,086,935 A | 7/2000 | Delrue et al. |
| 6,159,519 A * | 12/2000 | White et al. ............... 426/511 |

FOREIGN PATENT DOCUMENTS

| | | |
|---|---|---|
| DE | 3344214 | 6/1985 |
| DE | 19605650 | 6/1997 |
| EP | 094448 | 11/1983 |
| EP | 196 464 | 10/1986 |
| EP | 269257 | 6/1988 |
| EP | 556101 | 8/1993 |
| EP | 622085 | 11/1994 |
| GB | 1211779 | 11/1970 |
| GB | 2139872 | 11/1984 |
| GB | 2221830 | 2/1990 |
| JP | 52-034987 | 3/1977 |
| JP | 354064697 | 5/1979 |
| JP | 357033593 | 2/1982 |
| JP | 60-027355 | 2/1985 |
| JP | 363094968 | 4/1988 |
| JP | 406153896 | 6/1994 |
| JP | 08-205806 | 8/1996 |
| SU | 535343 | 11/1976 |
| SU | 1296569 | 3/1987 |
| SU | 1344779 | 10/1987 |
| WO | WO 86/05956 | 10/1986 |
| WO | WO 94/16053 | 7/1994 |
| WO | WO 94/29430 | 12/1994 |
| WO | WO 97/38734 | 10/1997 |
| WO | WO 00/25595 | 5/2000 |
| WO | WO 00/45646 | 8/2000 |

OTHER PUBLICATIONS

Akao et al., "Sterilization of Powdery Food by Superheated Steam," Eng.and Food, vol. 2, 1993, 595–600.

(List continued on next page.)

Primary Examiner—George C. Yeung
(74) Attorney, Agent, or Firm—Fitch, Even, Tabin & Flannery

(57) ABSTRACT

The invention provides process or method of malting cereal seeds, such as barley, wheat, rye, corn, oats, rice, millet and sorghum which process includes reducing the microbial level in the seeds prior to steeping, malting and the introduction of a starter culture used in the malting process. According to the invention, the reduction of microbial levels permits efficient use of starter cultures, such as molds, yeasts, bacteria, spores and activated spores.

39 Claims, 1 Drawing Sheet

OTHER PUBLICATIONS

Baquir, "Sanitation of Cereal Grains," *Dissertation Abstracts*, Dec. 1977, vol. 38, No. 6.

Casolari, "About Basic Parameters of Food Sterilization Technology," *Food Microbiology*, 1994, 11. 75–84.

Lawrence et al., "Fluidized Heating Process for Microbial Destruction in Wheat Flour," *Chemical Eng. Progress Symp. Series*, No. 86, vol. 64, pp. 77–84.

Martinez et al., "Caracteristicas quimicas y usos de harina instantanea de maiz il," Archivos Lantinoamericanos de Nutricion, 1993, 43, 316–320.

Copy of International Search Report from PCT/BE97/00086.

Angelino et al., "Impact of Microflora during Storage and malting on malt properties," Proceedings of the IV Chain v. DeClerck, Leuven, 1990.

Gylland et al., "The Influence of some Fungi on Malt Quality," Proceedings, Eue. Brew. Conv., vol. 16, 1977, p. 245–254.

Kopper et al., "Relation Between the Microflora of Barley and Malt Quality," Proceedings Eue. Brew. Conv., vol. 20, 1985, p. 70.

Medwid et al., "Germination of Rhizopus Oligosporus Sporangiospores," App. Env. Microbiol., vol. 48, No. 6, pp. 1067–1071 (1984).

Noots et al., "Improvement of Malt Hemi–cellulolysis by Use of Fungal Starter Cultures," Poster presented at the Institute of Brewing, Durban, South Africa, Mar., 1997.

Pekhtereva et al., "Effect of Yellow Pigmented Bacteria on Malt Quality," Fementnaya I. Spirtovaya Promyshlenmost, 7, 10, 1981.

Seaby et al., "Experimental Determination of Requirements for the growth of Edible Rhizopus Species for Use in Solid Substrate Fermentation Systems," J.Sci. Food Argic. Pp. 289–299 (1988).

Van Waesberghe, "Micro flora–Management in Industrial Malting Plant, Outlook and Opportunities," Ferment, vol. 4, No. 5, pp. 302–308 (1991).

* cited by examiner

METHOD FOR MALTING SEEDS

This application is a continuation-in-part application of application Ser. No. 09/461,890, filed Dec. 15, 1999, which application is a continuation-in-part application of Ser. No. 09/081,380, filed May 19, 1998, now U.S. Pat. No. 6,086,935, and this application (Ser. No. 09/736,961, filed on Dec. 14, 2000) also is a continuation-in-part application of Ser. No. 08/898,736 filed Jul. 23, 1997.

The present invention generally relates to a method for malting seeds, such as barley seeds and other cereals, such as wheat and sorghum seeds, legumes and pseudo-cereals. More particularly, the method includes reducing the microbial count of the seeds prior to malting and/or prior to adding a starter culture for the malting process.

Heat and moisture are applied onto the particulate seeds to provide a heated moist environment which provides surface moisture on the seeds during the application of heat. Heat is applied for a time and temperature sufficient to reduce the microbial load of the seeds or other malting seeds without affecting or minimally affecting, the loss of the ability of the seeds to germinate and undergo a malting process.

BACKGROUND OF THE INVENTION

Barley and other seeds, such as wheat and sorghum, are used for the production of beverages, such as beer. In most cases, a seed is subjected to a malting process to increase enzymatic activity. These enzymes, such as amylases, beta-glucanase and xylanase enzymes, degrade the starch and non starchy components from the seeds to prepare them to be used in processes such as brewing. In known malting processes, the moisture content of a seed, such as barley, is raised by immersion of the barley seeds in water. Thereafter, the barley with a high moisture content is allowed to germinate to provide a green malt. After germination, the green malt is dried under specific conditions. The final malt is cleaned to remove, for example, the sprouts and dust. Thereafter, it is used in processes, such as brewing, milling or other fermentation processes.

Barley and seeds contain naturally occurring microorganisms. Generally, the quality of the malt and the beverage derived therefrom can be affected by the presence of microorganisms naturally present on and in the barley and other seeds. Some microorganisms positively affect malting, some do not. Generally, these microorganisms are further developed and grown during the malting process. During microorganism growth, metabolites can be produced, some of which are known to negatively influence the quality of the final malt. For example, some molds such as Fusarium can produce vomitoxin (=deoxynivalenol, often referred to as DON). DON is a harmful mycotoxin and levels of that mycotoxin should be kept as low as possible. It is believed mold or yeast strains developed or grown during the germination process also produce proteins which are claimed to cause gushing in beer produced from that malt. Moreover, other products formed by microorganisms during germination can be polysaccharides which are believed to cause early flocculation of yeast during fermentation in the brewing of the malted seeds. Hence, many microorganisms adversely affect the malting process and/or adversely affect the quality of the beverage which is made from the seeds, such as barley.

Further, mycotoxins and/or other metabolites can be produced during the malting process. Indeed, malting process conditions from steeping to drying are such, that they encourage microbial growth and development and enhance the production of metabolites. And even though these metabolites originally present on the seed before the process generally are removed with the steep water after steeping, not all of the microorganisms and metabolites are removed. Moreover, after steeping and during the germination process and the first phase of the drying process, microorganisms can again develop and produce these metabolites.

A lower initial microbial count in seeds which undergo a malting process would not only reduce the level of undesirable microorganisms in the seeds, but also could prevent the production of metabolites of those microorganisms. A treatment lowering microbial count must be balanced so as not adversely affect the ability of the barley and other seeds to germinate, nor to destroy viable seed tissues critical to obtaining a good quality malted seeds. Hence, the embryo in the barley and other seeds should not be so adversely affected so that they will not be metabolically inactivated and will not germinate and produce, for example, enzymes as part of the malting process.

OBJECTS OF THE INVENTION

An object of the invention is to provide an improved preparation process for making malted seeds and to improve the malted seeds product of such process.

Another object of the invention is to provide a process and improved malted seed which vary less in quality with the raw material used.

Additional objects of the invention will become apparent with reference to this specification.

SUMMARY OF THE INVENTION

The invention provides a process or method of malting seeds selected from the group consisting of cereals, such as barley, wheat, rye, corn, oats, rice, millet and sorghum, pseudo-cereals, such as buckwheat, amaranth and legumes, such as soy. The process of the invention includes reducing the microbial level in the seed prior to steeping and malting and also can comprise the introduction of a starter culture used in the malting process. According to the invention, the reduction of microbial levels permits efficient use of starter cultures, such as molds, yeasts, bacteria, spores and activated spores. The invention also promotes malting without competition from microorganisms naturally present on the seeds before malting which not only negatively influence the malting process and the quality of the final malt, but also the quality of the products derived from the malted seeds In an important aspect, the invention provides a method for malting barley, sorghum and wheat, and in a very important aspect, barley. In another important aspect, the invention includes the addition of a starter culture, such as spores or activated spores, after the reduction of the microbial load. In the latter aspect, a starter culture, such as activated spores, provides increased enzymatic activity which is enhanced by reducing the microbial level in the seeds prior to the malting process. The increase of enzymatic activity may be due to reduced competition between the starter culture and the natural occurring microorganisms which have been reduced during the treatment, as well as possible changes in the surface properties of the seeds that permit a better adhesion of a starter culture on the seeds. In yet another important aspect, the process contemplates a continuous treating of the seeds prior to the addition of the starter culture and continuation of the malting process.

The method of the invention is unique in that it may be continuous and does not require increased pressures with sealed containers. The seeds are heated with moist heat and moisture on the surface of the seeds. Care should be taken not to over expose the seeds to the moist heat and/or over expose the seeds to moisture prior to heating because the seeds should not be cooked. Over exposing the seeds to moisture prior to heat will hydrate the seeds below the surface of the seeds and then the moist heat, such as steam, will tend to over heat the seeds, "cook" them and reduce their ability to germinate and sprout during the malting process. It is surface moisture on the surface of the seeds coupled with heating which is important in reducing the microbial content of the seeds without substantially adversely affecting the ability of the seeds to germinate and to produce enzymes which are sought through the malting process. Moist heat is applied by a fluid or fluidum which includes heated water or steam having a temperature in the range of about 60° C. to about 200° C.

The method of the invention will reduce the microbial count of the seeds, such as barley and wheat, by at least about five (5) times per gram of product for molds and $1 \times 10^2$ per gram for yeasts, and in an important aspect by at least $1 \times 10^3$ per gram of product for molds and $1 \times 10^4$ per gram of product for yeasts. Further, the method of the invention is practiced without the necessity of pressurizing the heating vessel to pressures substantially above one atmosphere or atmospheric conditions.

The method includes exposing the seeds to moist heat for a time and temperature that will reduce the microbial count, such as yeast and mold microbes, of the seeds by at least about a factor of five (5) per gram of seed, but will not reduce the germination energy of the seed after about 72 hours to less than about 80%. In general this means that seeds, such as barley and wheat, should be heated with surface moisture on the seeds for from about one to about thirty seconds at a temperature in the range of from about 50° C. to about 90° C. and preferably from about 60° C. to about 90° C. Temperature can be conveniently measured by placing a thermometer in the seed bulk. In one important aspect, the seed is a continuously moving stream of seeds. Where it is heated in a moist environment when it is a continuous moving stream, the seeds may be conveyed through a tube-like conduit via paddles where steam having a temperature of from about 100° C. to about 200° C. is injected through the paddles onto the seeds and increase the moisture content on the seeds. As the seeds go through the conduit, they have steam directly injected onto them which moisturizes and heats the surface of the seeds. The important function of the steam is to provide an amount of surface moisture on the malting seeds which with the heat will kill undesirable microorganisms, but not adversely affect the ability of the seed to sprout and germinate. In this aspect, the steam is effective for heating the seeds to a temperature of at least about 50° C., and in an important aspect, heats the seeds from about 60 to about 90° C. as they leave the conduit, the seeds residing from about 1 to about 45 seconds, and preferably 3–30 seconds in the conduit. The conduit also may have a heat source (additional to the directly injected steam) which is a jacket which substantially surrounds the conduit throughout its length where the jacket is heated such as by steam, oil, electrically or any other suitable means for heating. The heated jacket indirectly heats the seed.

In another important aspect of the invention where the seeds are treated when continuously moving as a stream, the seeds are conveyed on a pervious belt and has steam having a temperature of from about 100° C. to about 200° C. injected onto them as they proceed along the belt. In this aspect, the steam is applied to the surface of the seeds which are heated to at least about 50° C., and in an important aspect, the seeds are heated to about 65° C. to about 85° C. as they leave the belt, the seeds residing about 3 to about 30 seconds on the belt.

In another aspect, the seeds may be immersed in water at about 65° C. to about 90° C. for about 1 to about 20 seconds for good results.

The temperature of the heat source and time of exposure of the seeds to the heat source is a function of the sensitivity of the seeds to heating such that the time and temperature are effective for reducing the microbial count in the seeds by at least about a factor of five per gram of seeds, and the seed does not lose any substantial functionality for the malting process The combination of the temperature of the heat source, steam injection, surface moisture and time of exposure of the seeds to the heat source, however, should be effective to heat the seed to at least 50° C. and reduce the yeast and mold count by at least about a factor of five per gram of seed after the seeds are conveyed through the moist heat as described below.

The process of the invention can also include cooling the seeds after heating the seeds with moist heat to cool the seeds down and to ambient temperature. The heating can permit prolonged storage of the seeds with reduced microbial count.

DETAILED DESCRIPTION

Definitions

As used herein, the term "spore" refers to a dormant and highly resistant reproductive cell formed by bacteria and fungi in response to environment conditions that do not favor the growth of the organism. When exposed to favorable environmental conditions, spores are capable of developing into a viable adult organism without fusion with another cell.

As used herein, the term "activated spore" means a spore having one of the following properties.

I. The spore is swollen such that its size is increased by a factor of between about 1.2 and about 10 over its dormant size; and/or II. One or more germ tubes per spore is formed. Activated spores are prepared by one or a combination of the following treatments:

i. Cycles of wetting and/or drying;
 ii. Addition of appropriate nutritional supplies (such as a nitrogen source, preferably amino acids and/or a carbon source, preferably mono-or disaccharides) or spore elements;
 iii. Exposure to temperature changes, preferably within a temperature range of about 0° to about 80° C.
 iv. Exposure to changes in pH, preferably within a pH range of about 2.0 to about 8.0,
 more preferably about 3.0 to about 6.0.

The term "germination" as used herein means the beginning or resumption of growth by a seed. In accordance with the process of the present invention, germination begins to occur during and/or after the seeds have been steeped.

Germination of seed is generally understood to mean hydration of the seeds, swelling of the seeds and inducing growth of the embryo. Environmental factors affecting germination include moisture, temperature and oxygen level. Root and shoot development are observed.

As used herein, the term "steeping" refers to wetting of the seeds. Wetting may include one or more stages over a time and temperature effective for providing a moisture content of between about 20% and about 60% by weight.

Figure 1:
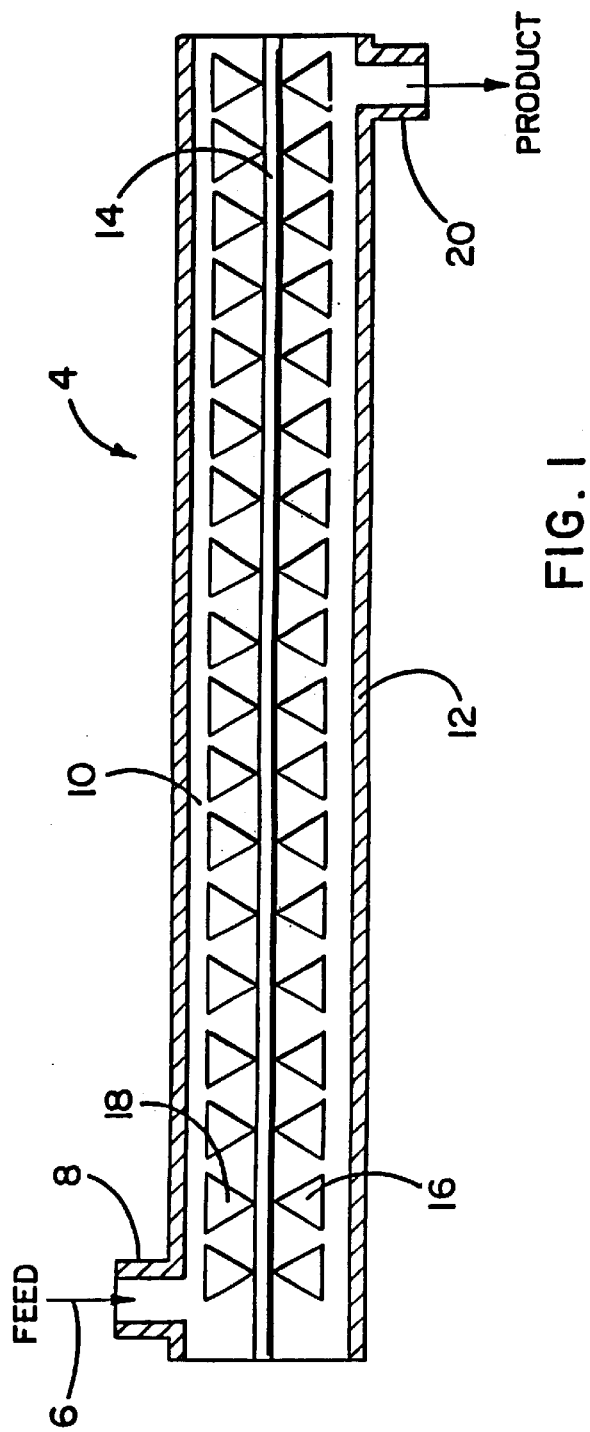
FIG. 1 is a schematic diagram of an apparatus which can be used to practice the invention.
Figure 2:
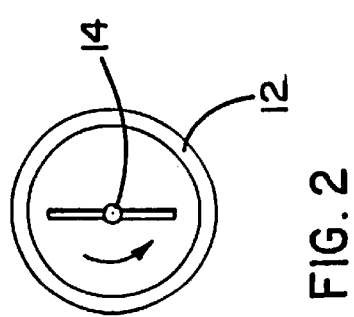
FIG. 2 is a side view of the conduit in the apparatus shown in FIG. 1.

In one embodiment of the invention, the seeds for malting are fed into a elongated heating device 4 which is shown in FIG. 1 The seeds are fed into the heating device from hopper 6 through feed aperture 8 into channel 10. The seeds are conveyed down channel 10 in the y direction. Channel 10 is surrounded by a steam jacket 12 through which steam may be circulated. A hollow rod 14 extends longitudinally down the center of the channel. A plurality of paddles 16 are mounted on the rod 14 down its longitudinal length. The rod 14 is rotated and the paddles are angled such that as the rod rotates the paddles, the paddles mix the seeds and push the seed down channel 10. The paddles have openings 18 from channels which extend through the paddles to the hollow center of rod 14. These openings transmit steam going through the rod and paddles so that the steam may be injected onto the seeds being transmitted down channel 10. As the rod rotates, the paddles push the seed down the conduit to exit aperture 20 through which the seeds with the microbial reduced load drops. The openings in the paddles may be opened or closed to control steam injection onto the seeds being transmitted down the channel. In one aspect of the invention, some of the openings in the paddles towards the feed input end of the channel are open to transmit steam from the hollow rotating rod 14 onto the seeds. Steam can be supplied through the rod and through the paddles onto the to-be-treated particulate seeds. The amount of steam injected is effective for providing a moist environment, increasing the moisture content on the surface of the seeds and to heat the product as described above. Additional indirect heating of the particulate seeds may be done by using indirect heat from the jacket of the device. Just enough steam is injected to provide moisture on the surface of the to be treated particulate seeds. With the moisture and heat from the steam and the indirect heat from the jacket heat source of the device, the conditions are sufficient to kill microorganisms at the surface of the seeds without substantially reducing the ability of the seeds to germinate. The higher moisture content, the heat and the time of exposure of the seeds to the heat must be limited to prevent the functional properties of the cereal to be negatively influenced. A device which can be used to treat the particulate seed as described herein is available as a Solidaire Model SJCS 8-4 from the Hosokawa Bepex Corporation, 333 N.E. Taft Street, Minneapolis, Minn. 55413, but the invention is not limited to such a device or a device with paddles for the injection of steam.

The rotating paddles as vehicles for injecting steam, assure that the steam is uniformly distributed over the surfaces of the seeds, but not into the seed particle. It is important that there is sufficient mixing of the seeds during the treatment that the surfaces of the seeds are moist and achieve a temperature of at least about 50° C.

The starter culture, such as spores and/or activated spores, can be introduced before or during the various germination or steeping stages. For example, activated spores can be introduced during the various germination or steeping stages. In the case of activated spores, the concentration of the spores vary depending on the conditions of the malting process and the type of active spore being utilized. Generally about $1\times10^2$ to about $1\times10^7$, preferably about $1\times10^3$ to about $1\times10^5$ activated spores per gram air dry seed is utilized.

The seed after the steam and heat treatment then is wetted and mixed with a starter culture which may be combined with the seeds either before or after wetting. When the invention utilizes a starter culture, such as spores or activated spores from microorganisms, such as bacteria or molds, a surprising increase in enzymatic activity of the malted seeds results. In this aspect, the process generally comprises combining water, the seeds and activated spores and holding the combination until seeds of enhanced enzymatic activity is formed. Generally, the combination is made by inoculating the moistened seeds with the activated spores, but as previously noted, the spores or activated spores and seeds may be combined before or after the moistening of the seeds, but after reducing the microbial count of the seeds. In the process of the invention, the combination of wetted seeds and starter culture has a concentration of starter culture, holding time and holding temperature which are effective for providing the seeds with an increase in enzymatic activity of at least one enzyme, such as β-glucanase, xylanase, amylases, debranching enzymes, proteases and/or other naturally occurring enzyme activities, which are greater than the enzymatic activity which is obtained by holding the wetted seeds without the reduced microbial count and without a starter culture, such as activated spores.

In this aspect, the seed, spores or activated spores are combined before or after the time of wetting the seeds and the combination is held at a temperature of at least about 5° C. and not more than about 30° C., preferably between about 10° C. to about 20° C. and the activated spores are at a concentration in the combination to obtain an increase in enzymatic activity of the malted seeds. The wetted or moistened seeds and activated spore combination is held for a time and temperature until the seeds have a moisture content of at least about 20 weight percent. The moistened seeds and activated spores are held together until the seeds have a moisture content of between about 20 to about 60 weight percent, preferably from about 38 to about 47 weight percent, and are allowed to germinate for about 2 to about 7 days, preferably about 3 to about 6 days, at a temperature of from about 10° to about 30° C., preferably from 14° to about 21° C. In important aspect, the germinated seeds are dried at a temperature of from about 40° to about 150° C., preferably between about 45° and 85° C. until the dried malted seeds have a moisture content of from about 2 to about 15 weight percent moisture, preferably from about 3 to about 7 weight percent moisture.

Microorganisms, spores, and activated spores which may be used in the invention may be from the microbes selected from the group comprising of Enterococcus spp., Micrococcus spp., Pediococcus spp., Leuconostoc spp., Lactobacillus spp., Brevibacterium spp., Corynebacterium spp., Propionibacterium spp., Bacillus spp., Acetobacter spp., Pseudomonas spp., Pichia spp., Sacchaaromyces spp., Zygosaccharomyces spp., Hanseniaspora spp., Rhodotorula spp., Torulopsis spp., Trichosporon spp, Kloeckera spp., Candida spp., Geotrichum spp., Neurospora spp., Monascus spp., Mucor spp., Rhizopus spp., Rhizopus oryzae strain ATCC 9363, Trichoderma spp., Aspergillus spp., Penicillium spp., Amylomyces spp., and mixtures thereof. The scope of the present invention is, however, not limited to the above-mentioned list of microorganisms.

EXAMPLE 1

FLUIDIZED BED SYSTEM

Barley was used in the test. Samples of barley were placed in a special device or chamber. Heated moist air was injected into the barley samples. This injection resulted in a fluidization of the barley and a surface treatment to reduce the microbial count. The time is the time in seconds the barley was treated in the chamber. The temperature is the temperature of the barley sample direct after treatment. The barley treated was a US 6-row variety standard used for malting purposes. Samples were analyzed on microbial count such as total aerobic plate count, molds and yeasts. The germination energy was measured according to the B.F. method 3.6.2 Analytic EBC with the addition of 4 ml water. Germination energy of 100 means that all the barley analyzed was germinated after 72 hours.

| Test | Time (sec) | Temp (C.) | Germ. Energy 72 hrs. | T.P.C./ Gram | Yeasts/ Gram | Molds/ Gram |
| --- | --- | --- | --- | --- | --- | --- |
| 1 | 3 | 67 | 93 | 5.20E+05 | 100 | 2,900 |
| 1b | 3 | 66 | 92 | 4.50E+05 | 350 | 2,300 |
| 2 | 3 | 77 | 90 | 3.50E+05 | 20 | 1,700 |
| 3 | 3 | 77 | 90 | 1.00E+05 | 200 | 1,400 |
| 4b | 3 | 85 | 95 | 2.00E+06 | <10 | 630 |
| 4 | 7 | 85 | 90 | 7.40E+05 | <10 | 210 |
| 5 | 7 | 67 | 90 | 1.60E+06 | 30 | 310 |
| 7 | 7 | 77 | 98 | 1.20E+06 | <10 | 320 |
| 8 | 7 | 87 | 70 | 5.00E+06 | <10 | 170 |
| 9 | 14 | 67 | 85 | 1.80E-06 | <10 | 550 |
| 9b | 14 | 67 | 87 | 1.40E+06 | <10 | 290 |
| 10 | 14 | 78 | 83 | 1.00E+06 | <10 | 160 |
| 11 | 14 | 78 | 71 | 9.30E+04 | <10 | 60 |
| 12 | 14 | 85 | 40 | 5.60E+03 | <10 | 40 |
| 13 | 28 | 67 | 65 | 1.50E+04 | <10 | 580 |
| 14 | 28 | 77 | 25 | 6.00E+02 | <10 | 10 |
| 15 | 28 | 78 | 15 | 8.00E+02 | <10 | 20 |
| 16 | 28 | 85 | 35 | 1.10E+03 | <10 | 650 |
| 16b | 28 | 84 | 15 | 9.70E+03 | 10 | 20 |
| control | | | 95 | 7.60E+07 | 34,000 | 26,000 |

EXAMPLE II

ROTOR WITH PADDLES

Barley: samples treated with a rotor which includes paddles which inject steam onto the barley being conveyed down a tunnel-like conduit by the rotating paddles.

Control: not steam heat treated.

Sample: steam heat treated.

The barley treated was a 6-row malting barley variety as described in Example I.

Microbial Reduction Treatment: product temperature 60° C., time treatment in the conduit: 10 seconds; direct steam temperature 111° C. Jacket temperature (indirect) 149–150° C.

Microbial content sample:

|  | T.P.C./g | Yeasts/g | Molds/g |
| --- | --- | --- | --- |
| Control | 670000 | 35000 | 27000 |
| Sample | 50000 | 100 | 2400 |

Malting process: the microbial reduced barley (400 g) was steeped in an erlemeyer flask (2 liter). Barley: water ratio 1:1. The erlemeyer was agitated on an orbital shaker (100 rpm) during the wet stages. During the wet stages the barley was aerated with filter sterilized air. The steeping program was carried out by:

wet stage, 6 hrs.

dry stage, 17 hrs.

wet stage 5 hrs.

dry stage 16.50 hrs.

wet stage 2.50 hrs.

After steeping, the germination was carried out in a Joe White micromalting unit using three temperature steps: 14 hours at 20° C., 2 hours at 18° C., 80 hours at 16° C. Kilning was carried out in the same malting unit using 7 temperature steps: 3 hours at 62° C., 2 hours at 65° C., 2 hours at 68° C., 2 hours at 73° C., 1 hour at 78° C., 2 hours at 80° C., 6 hours at 83° C.

DON analysis were done using a GC method.

Malting with a starter culture (S.C.): Activated spores from Rhizopus oryzae ATCC 9363 were used as starter culture. Activated spores (10.000/per gram dry barley) were added during the first wet steeping cycle.

DON Analysis on Malted Barley

|  | DON ppm | |
| --- | --- | --- |
|  | Average | st. dev. |
| Barley | 3.34 | 0.69 |
| Malt |  |  |
| Control | 0.53 | 0.69 |
| Sample | 0.27 | 0.01 |
| Control with S.C. | 0.43 | 0.11 |
| Sample with S.C. | 0.36 | 0.05 |

2 trials, 2 analyses each

Results show that the steam treated barley gives a lower DON value than the untreated barley and that the standard deviation of the treated barley is much lower.

Results: beta glucanase activity (abs/g dry weight) in the dried malt.

|  | 1 | 2 | 3 |
| --- | --- | --- | --- |
| Blanc |  | 17.78 | 11.89 |
| Test |  | 13.06 | 8.57 |
| Blanc with S.C. | 64.57 | 30.96 | 85.78 |
| Test with S.C. | 156.3 | 138.15 | 189.12 |

Results show that the steam treated barley gives with the starter culture an increased level of enzyme activity.

EXAMPLE III

IMMERSION BARLEY

Barley samples were immersed for different times in water at different temperatures. After immersion, the samples were dried and further analyzed. The barley was 6 Row U.S. barley as described in Example I.

BARLEY

| Test | Time(s) | Product Temp (C.) | Germ. Energy 72 hrs. | T.P.C./g | Molds/g |
|---|---|---|---|---|---|
| 1 | 2 sec | 95 C. | 84 | 7300 | 110 |
| 2 | 2 sec | 95 C. | 89 | 96000 | 96000 |
| 3 | 5 sec | 95 C. | 52 | 800 | 800 |
| 4 | 5 sec | 95 C. | 50 | 70 | 70 |
| 5 | 2 sec | 75 C. | 89 | 3200000 | 300 |
| 6 | 2 sec | 75 C. | 89 | 300000 | 2100 |
| 7 | 5 sec | 75 C. | 90 | 190000 | 1100 |
| 8 | 7 sec | 75 C. | 86 | 150000 | 210 |
| 9 | 7 sec | 75 C. | 93 | 470000 | 150 |
| 10 | 14 sec | 75 C. | 90 | 50000 | 1000 |
| 11 | Ctrl | — | 94 | 190000 | 99000 |

EXAMPLE IV

IMMERSION WHEAT

Wheat samples were immersed for different times in water at different temperatures. After immersion, the samples were dried and further analyzed. The wheat was Stephen a White wheat variety, used for malting purposes.

| Sample | Test | Time(s) | Temp. C. | Germ. Energy % * | T.P.C./ Grams ** | Yeasts/ Grams | Molds/ Grams |
|---|---|---|---|---|---|---|---|
| Wheat | 1 | 3 | 66 | 100 | 1.60E+05 | 1.00E+01 | 3.60E+02 |
| Wheat | 1b | 3 | 66 | 100 | 1.20E+05 | <10 | 1.60E+02 |
| Wheat | 2 | 3 | 77 | 100 | 1.50E+05 | <10 | 1.50E+02 |
| Wheat | 3 | 3 | 77 | 97 | 1.80E+05 | <10 | 7.00E+01 |
| Wheat | 4 | 3 | 88 | 78 | 4.90E+04 | <10 | 4.00E+01 |
| Wheat | 4b | 3 | 88 | 75 | 9.00E+05 | <10 | 1.70E+02 |
| Wheat | 5 | 7 | 66 | 100 | 1.80E+05 | <10 | 2.10E+03 |
| Wheat | 6 | 7 | 77 | 93 | 6.40E+04 | <10 | 1.20E+02 |
| Wheat | 7 | 7 | 77 | 92 | 1.50E+05 | <10 | 1.00E+03 |
| Wheat | 8 | 7 | 88 | 15 | 8.30E+03 | <10 | <10 |
| Wheat | 9 | Ctrl | — | 100 | 1.30E+05 | 4.40E+03 | 1.00E+03 |

\* Germination Energy Number.
\*\* Total Plate Count.

EXAMPLE V

BARLEY

6-Row U.S. malting barley was treated in a conduit with direct and indirect heat. After the treatment, samples were cooled and dried to remove surface moisture. Samples were further analyzed.

| | Indirect Heat Jacket Temp.* | Direct Steam Temp. from Rotor* | Temp. of Product after Treatment* | Time (sec.) | Germination Energy 72 hrs. |
|---|---|---|---|---|---|
| Test a | 241 | 251 | 155 | 7.5 | 80 |
| Test b | 281 | 251 | 161 | 7.5 | 88 |
| Test c | 251 | 299 | 165 | 10.5 | 81 |
| Control | | | | | 91 |

*Degrees Fahrenheit

| | T.P.C./gram | Yeasts/gram | Molds/gram |
|---|---|---|---|
| Test a | 3.00E+06 | 1.00E+01 | 7.00E+02 |
| Test b | 1.60E+06 | <10 | 5.00E+01 |
| Test c | 1.40E+07 | <10 | <10 |
| Control | 5.70E+06 | 2.10E+04 | 1.30E+04 |

What is claimed is:

1. A process for treating seeds comprising:
    heating the seeds which have a microbial count and a germination energy with moist heat which is effective for applying moisture on the surface of the seeds and heating the seeds for a time and temperature which will reduce the microbial count of the seeds, but not reduce the germination energy of the seeds after about 72 hours to less than about 80% to provide a microbial reduced seed;
    wetting the microbial reduced seed to increase its moisture content to provide a wetted seed; and
    holding the wetted seed for a time and temperature to permit it to germinate and provide a treated seed.
2. The process for treating seeds as recited in claim 1 wherein the moist heat is applied to the seeds for a time in the range of from about 1 second to about 30 seconds to heat the seeds to a temperature in the range of from about 60° C. to about 90° C.
3. The process for treating seeds as recited in claims 1 or 2 wherein a starter culture is mixed with the microbial reduced seed before or after the wetting of the microbial reduced seed.
4. The process for treating seeds as recited in claim 3 wherein the starter culture is activated spores.
5. The process for treating seeds as recited in claim 4 wherein the seeds are selected from the group consisting of barley, wheat and sorghum.
6. The process for treating seeds as recited in claims 1 or 2 wherein the heating is done by injecting steam onto the seeds to provide surface moisture on the seeds and heat the seeds.
7. The process for treating seeds as recited in claim 1 wherein steam is injected onto a continuously moving stream of seeds to provide surface moisture on the seeds and heat seeds.
8. The process for treating seeds as recited in claim 1, wherein the microbial count which is reduced is selected from the group consisting of yeast and molds and mixtures thereof.

9. The process for treating seeds as recited in claim 4 wherein steam is injected onto a continuously moving stream of seeds to provide surface moisture on the seeds and heat the seeds for about 1 to about 45 seconds to heat the seeds to a temperature of from about 60° C. to about 90° C.

10. The process for treating seeds as recited in claim 9 wherein the seeds are selected from the group consisting of barley, wheat and sorghum.

11. A process for treating seeds comprising:
heating the seeds which have a microbial count and a germination energy with moist heat which is effective for applying moisture on the surface of the seeds and heating the seeds for a time and temperature which will reduce the microbial count of the seeds and which will not reduce the germination energy of the seeds after about 72 hours to less than about 80% to provide a microbial reduced seed;
wetting the microbial reduced seed to increase its moisture content to provide a wetted seed;
mixing a starter culture with the microbial reduced seed before or after the wetting of the microbial reduced seed to provide a wetted seed/starter culture blend; and
holding the wetted seed starter culture blend for a time and temperature to permit it to germinate and provide a malted seed which has an enzyme activity which is greater than an enzyme activity which is obtained by a treating process on the seed which does not have a reduced microbial count through the heating thereof.

12. The process for treating seeds as recited in claim 11, wherein the microbial count which is reduced is selected from the group consisting of yeast and molds and mixtures thereof.

13. The process for treating seeds as recited in claim 12 wherein the starter culture is activated spores.

14. The process for treating seeds as recited in claims 11 or 13 wherein the seeds are selected from the group consisting of barley, wheat and sorghum.

15. The process for treating seeds as recited in claims 11 or 13 wherein the heating is done by injecting steam onto the seeds to provide surface moisture on the seeds and heat the seeds for bout 1 to about 30 seconds to heat the seeds to a temperature of from about 60 to about 90° C.

16. The process for treating seeds as recited in claim 11 wherein steam is injected onto a continuously moving stream of seeds to provide surface moisture on the seeds and heat the seed.

17. The process for treating seeds as recited in claim 14 wherein steam is injected onto a continuously moving stream of seeds to provide surface moisture on the seeds and heat the seeds for about 1 to about 30 seconds to heat the seeds to a temperature of from about 60 to about 90° C.

18. The process for treating seeds as recited in claim 14 wherein the heating of the seeds is for a time and temperature which will reduce the microbial count of the seeds by at least about $1 \times 10^2$ per gram of seed.

19. A process for treating seeds having a microbial count and germination energy, the process comprising:
conveying the seeds as a continuous stream and heating the stream of seeds with moist heat to bring the seeds to a temperature for a time to reduce the microbial count of the seeds by at least about $1 \times 10^2$ per gram of seed, but not reduce the germination energy of the seeds after about 72 hours to less than about 80% to provide a microbial reduced seed;
wetting the microbial reduced seed to increase its moisture content to provide a wetted seed; and
holding the wetted seed for a time and temperature to permit it to germinate and provide a treated seed.

20. The process for treating seeds as recited in claim 19 wherein the seeds are selected from the group consisting of barley, wheat and sorghum.

21. The process for treating seeds as recited in claim 20 wherein steam is injected onto the continuously moving stream of seeds to provide surface moisture on the seeds and heat the seed.

22. The process for treating seeds as recited in claim 21 wherein the continuously moving stream of seeds is moving on a pervious belt and has steam injected onto it as it proceeds along the belt to heat the seeds for about 3 to about 30 seconds to a temperature of from about 65° C. to about 85° C.

23. The process for treating seeds as recited in claim 19, wherein the microbial count which is reduced is selected from the group consisting of yeast and molds and mixtures thereof.

24. A process for treating seeds comprising:
moving the seeds which have a microbial count and a germination energy through a conduit;
injecting steam onto the seeds as they are being conveyed through the conduit to heat the seeds and provide a moisture content on the surface of the seeds;
mixing the seeds as they are exposed to the steam and as they are conveyed through the conduit and while the steam is being injected onto the seeds, the temperature of the steam, the moisture content on the surface of the seeds, the mixing being at a rate, and the time of exposure of the seeds to the heat and steam being effective for reducing the microbial count of the seeds, but not reduce the germination energy of the seed after about 72 hours to less than about 80% to provide a microbial reduced seed;
wetting the microbial reduced seed to increase its moisture content to provide a wetted seed; and
holding the wetted seed for a time and temperature to permit it to germinate and provide a treated seed.

25. The process for treating seeds as recited in claim 24 wherein the microbial count which is reduced is selected from the group consisting of yeast, molds and mixtures thereof and the seeds are selected from the group consisting of barley, wheat and sorghum, the steam having a temperature and the seeds being conveyed through the conduit at a rate which is effective for heating the seeds for about 3 to about 30 seconds to a temperature of from about 60° C. to about 90° C. as they leave the conduit.

26. The process for treating seeds as recited in claims 24 or 25 wherein a starter culture is mixed with the microbial reduced seed before or after the wetting of the microbial reduced seed.

27. A process for treating seeds comprising immersing the seeds in water having a temperature of from about 65° C. to about 90° C. for about 1 to about 20 seconds to provide a microbial reduced seed;
wetting the microbial reduced seed to increase its moisture content to provide a wetted seed; and
holding the wetted seed for a time and temperature to permit it to germinate and provide a treated seed.

28. A process for treating seeds comprising:
heating the seeds having a microbial count and germination energy with moist heat which is effective for applying moisture on the surface of the seeds and heating the seeds for about 1 to about 45 seconds to a temperature of from about 60° C. to about 90° C., but not reduce the germination energy of the seeds after about 72 hours to less than about 80% to provide a microbial reduced seed;

wetting the microbial reduced seed to increase its moisture content to provide a wetted seed; and holding the wetted seed for a time and temperature to permit it to germinate and provide a treated seed.

29. The process as recited in claim 28 wherein vomitoxin is reduced.

30. A process for treating seeds comprising:

heating the seeds which has a microbial count and a germination energy with moist heat which is effective for applying moisture on the surface of the seeds and heating the seeds for a time and temperature which will reduce the microbial count of the seeds by at least about $1 \times 10^2$ per gram of seed, but not reduce the germination energy of the seeds after about 72 hours to less than about 80% to provide a microbial reduced seed;

wetting the microbial reduced seed to increase its moisture content to provide a wetted seed;

mixing a starter culture with the microbial reduced seed before or after the wetting of the microbial reduced seed; and holding the wetted seed for a time and temperature to permit it to germinate and provide a treated seed which has an enzymatic activity which is greater than the enzymatic activity of a malted seed which is treated without having the microbial reduced seed.

31. The process for treating seeds as recited in claim 30, wherein the moist heat is applied by exposing the seeds to steam for a time of at least 1 second and to obtain a temperature at the surface of the seeds in the range of 60° to about 90° C.

32. The process for treating seeds as recited in claim 21, wherein the continuously moving stream of seeds is moving on a pervious belt and has steam injected onto it as it proceeds along the belt to heat the seeds for about 3 to about 30 seconds and to obtain a seed temperature in the range of 65 to about 85° C.

33. The process for treating seeds as recited in claim 1, wherein heating comprises:

moving the seed through a conduit;

injecting steam onto the seeds as it is being conveyed through the conduit to heat the seeds and provide an increased moisture content on the surface of the seeds;

mixing the seeds as they are being exposed to the steam and as it is being conveyed through the conduit and while the steam is being injected onto the seeds.

34. A malting process for malting seeds comprising:

heating the seeds which have a microbial count and a germination energy with moist heat which is effective for applying moisture on the surface of the seeds and heating the seeds for a time and temperature which will reduce the microbial count of the seeds, but not reduce the germination energy of the seeds after about 72 hours to less than about 80% to provide a microbial reduced seed;

wetting the microbial reduced seed to increase its moisture content to provide a wetted seed;

holding the wetted seed for a time and temperature to permit it to germinate and provide a treated seed; and drying the treated seed to provide a malted seed.

35. The malting process for malting seeds as recited in claim 34 wherein the moist heat is applied to the seeds for a time in the range of from about 1 second to about 30 seconds to heat the seeds to a temperature in the range of from about 60° C. to about 90° C.

36. The malting process for malting seeds as recited in claims 34 or 35 wherein a starter culture is mixed with the microbial reduced seed before or after the wetting of the microbial reduced seed.

37. The malting process for malting seeds as recited in claim 36 wherein the starter culture is activated spores.

38. The malting process for malting seeds as recited in claim 37 wherein the seeds are selected from the group consisting of barley, wheat and sorghum.

39. The malting process for malting seeds as recited in claims 34 or 35 wherein the heating is done by injecting steam onto the seeds to provide surface moisture on the seeds and heat the seeds.

* * * * *